Reissued June 23, 1953 Re. 23,671

UNITED STATES PATENT OFFICE 23,671

EXTREME PRESSURE LUBRICANT

Elmer B. Cyphers, Cranford, N. J., assignor to Standard Oil Development Company, a corporation of Delaware No Drawing. Original No. 2,540,570, dated February 6, 1951, Serial No. 65,520, December 15, 1948. Application for reissue May 3, 1952, Serial No. 286,004

4 Claims. (Cl. 252—46.6)

Matter enclosed in heavy brackets [ ] appears in the original patent but forms no part of this reissue specification; matter printed in italics indicates the additions made by reissue.

This invention pertains to extreme pressure lubricants and compositions for imparting extreme pressure or load carrying properties to lubicating oils. The invention also pertains to a method for preparing extreme pressure agents, incorporating elements such as sulfur, phosphorus, and the like, in such a manner that they will be available for suitable chemical activity under heavy load conditions.

As is well understood in the art, ordinary mineral base lubricating oils and greases which are used to lubricate opposed metal surfaces are likely to fail under extremely heavy load conditions. For example, certain machine elements such as the hypoid gears commonly used in automotive vehicles may be subjected at times to extremely heavy pressures of the order of hundreds of thousands of pounds per square inch. If the film of lubricating oil separating the opposed elements fails, as it is likely to do under such pressure, the surfaces will contact each other directly, generating high temperatures due to friction, with resultant seizure or excessive wear and early failure. Extreme pressure additives containing active sulfur, phosphorus, or chlorine, or two or more of these, are effective to react immediately with the metal surfaces at their higher temperatures to form a protective metal sulfide, phosphide, or chloride film which serves temporarily as a lubricating medium until the normal oil film between the parts can be reestablished. Extreme pressure additives are, therefore, reactive with the metals they lubricate to form extremely thin protective films thereon when the temperature rises due to normal oil film failure.

According to the present invention, it has been discovered that compositions having extreme pressure properties and other desirable properties for use in lubricating oil compositions and the like may be prepared from various glycol esters of ordinary rosin and related hydrogenated materials and from fatty acids and other organic acids. The structures of the glycols which may be employed vary widely in respect to chain length, hydroxyl groups, ether linkages or in other aspects, varying with requirements of oil solubility, reactive oxygen groups, reactive double bonds and the like. The glycol esters can be represented by the generalized formula:

$$R-\overset{O}{\overset{\|}{C}}-X-(-CHZ-CHZ'-X-)_n-Y$$

wherein X represents oxygen or sulfur, n represents an integer from 1 to 4, and Y represents hydrogen or an $$R'-\overset{O}{\overset{\|}{C}}\text{-group}$$

and R and R′ represent hydrocarbon radicals and Z and Z′ are radicals consisting of —H or an alkyl hydrocarbon having from 1 to 4 carbon atoms.

It is necessary that the esters used in the present invention have at least one double bond capable of reacting with sulfur, phosphorus sulfide, a phosphorus halide, oxyhalides, selenides, and the like. Thus, whereas R and R′ in the above formula may be aliphatic, aromatic or substituted aromatic, or cyclic [,] *hydrocarbon radicals such as acid residue, that is to say that portion of an organic acid exclusive of the carboxyl group,* it is necessary that R or R′ contain an ethylenic bond. Preferably, both R and R′ contain ethylenic bonds, and contain from 11 to 21 carbon atoms.

The following glycols and acids may be esterified in various combinations to form a wide variety of useful esters, which may be used to prepare the additives of the invention. It is to be understood, however, that the compounds listed are given for illustration only and should not be construed as limiting the invention, which is limited only by the appended claims.

Glycols:
- Ethylene
- Diethylene
- Triethylene
- Propylene
- Dipropylene
- Butylene Thioglycols:
- Monothioethylene glycol
- Dithioethylene glycol Acids:
- Aliphatic:
  - Oleic
  - Stearic
  - Palmitic
  - Lauric
  - Linoleic
  - Linolenic
  - Ricinoleic Aromatic:
- Benzoic
- Toluic
- Phenyl acetic
- Phenyl propionic
- Dehydroabietic
- Isopropyl benzoic
- Tertiary octyl benzoic
- Phenyl ethanoic Cyclic:
- Abietic
- Neoabietic
- Dextropimeric Mixed acids:
- Talloil
- Mixed rosin acids
- Lard oil acids
- Sperm oil acids Of these esters, those which contain one aliphatic acid and one cyclic or substituted cyclic acid are preferred.

Acids which have been found to be especially suitable for reaction with the dihydric alcohols to form the esters used in the present invention are the naturally occurring rosin and talloils, and the hydrogenation products thereof. The talloils contemplated are by-products from sulfate wood pulp digestion, consisting mainly of rosin acids and fatty acids.

In producing the additive of the present invention, the ester is sulfurized and phosphorized. In one modification, the ester is first reacted with elemental sulfur, for example, by heating at a temperature somewhat in excess of 250° F. and preferably in the range of 280° to 500° F. The reaction time may vary from about one hour to 10 hours although by the addition of a sulfurization catalyst, such as sulfur chloride or sulfur dichloride and the like, the reaction may be hastened somewhat. The sulfurized product is then reacted with a bi-elemental phosphorus compound for example, $P_4S_3$, $P_4S_7$, $P_2S_5$, $PCl_3$, $PCl_5$, $P_2O_5$, etc. The phosphorizing reaction is suitably carried out at relatively low temperatures of the order of 150° to 250° F., preferably in the range of 200 to 230° F. A lower temperature is ordinarily required in the case of halides. In general this reaction may be completed in from 6 to 12 hours. In another modification, the sulfurization and phosphorization is carried out simultaneously by reacting the ester with a sulfide of phosphorus, or with a mixture of sulfur and a bi-elemental phosphorus compound. In this modification the reactants are heated to 150° to 250° F, preferably to 200° to 230° F. for 2–5 hours, and then further heated to a higher temperature preferably in the range 300–400 F. for several hours, or until a product is obtained which does not blacken copper when tested in the concentration in which the additive is to be employed.

The invention will be more fully understood by reference to the following examples:

EXAMPLE I

An ethylene glycol ester of talloil consisting substantially of esters of the type $$R—COOCH_2—CH_2OOC—R'$$

wherein R is a fatty acid *residue* and R' is a rosin acid *residue*, was employed in laboratory investigation.

376 grams of this ethylene glycol ester of talloil were heated to 290° F. and 24 grams of sulfur flowers were added; the mixture was stirred and heated to 395° F. and maintained between 360° and 395° F. for 2 hours and then cooled. The sulfurized product was analyzed and found to contain 5.64% of sulfur and in a 10% concentration in mineral oil showed no discoloration of a copper strip in one hour at 250° F.

The sulfurized product was further reacted with 0.5% by weight of $P_4S_3$ for a period of 12 hours at 210° F. with stirring. The product was then cooled and was found to contain 0.21% phosphorus and 5.71 sulfur.

10% by weight of each of the above additives was blended in 90% of a mineral lubricating oil having the following characteristics:

| | | |
|---|---|---|
| Gravity | °API | 25.4 |
| Flash | °F | 460 |
| Con. carbon | | 1.754 |
| Sulfur | per cent | 0.48 |
| Pour | °F | +10 |
| Vis./100 | | 1445.7 |
| Vis./210 | | 109.8 |
| V. I. | | 97.3 |

The lubricants thus formed showed the following characteristics:

| | |
|---|---|
| Vis./100 SUS | 1736.4 |
| Vis./210 SUS | 126.7 |
| V. I. | 101.4 |
| Copper corrosion | Bright |

It will be noted that this additive improves the viscosity index of the base oil to which it is added. This is an advantage in addition to the excellent load-carrying properties shown in Table I.

EXAMPLE II 552 grams of the same ester were reacted with 48 grams of sulfur at 300° F. for 7 hours, the product containing 7.58% of sulfur at this point. This material was subsequently treated with 0.5% of phosphorus sesquisulfide ($P_4S_3$) for 12 hours at 215° F., after which analysis showed 0.31% phosphorus and 7.64% sulfur. A 10% blend in mineral oil of the same type as was employed in Example I, but of slightly lower viscosity showed the following characteristics:

| | Mineral Oil Alone | 10% Example II in Mineral Oil |
|---|---|---|
| Vis./100° F. SUS | 942.0 | 1007.2 |
| Vis./210° F. SUS | 85.5 | 89.0 |
| Viscosity Index | 95.5 | 96.2 |
| Copper Corrosion (1 hr. at 250° F.) | Bright | Bright |

Performance characteristics of this product are shown in Table I.

This preparation was repeated three times on a larger scale and the products showed essentially the same analyses and performance characteristics. A mixture of the three preparations was blended with mineral oil as follows to produce a lubricant for full scale axle driving tests.

10.0% additive Example III
1.0% a wax-naphthalene pour depressant
34.0% Pennsylvania steam refined cylinder oil of 230.9 vis./210 SUS
55.0% Mid-Continent acid refined lubricating stock of 50.5 vis./210 SUS The resulting lubricant was found to perform satisfactorily in automotive hypoid gears under conditions of either high torque and low speed (truck type operation) or high speed and low torque (passenger car type operation).

EXAMPLE III

A pilot plant batch of additive was prepared from a commercially available ethylene glycol ester of talloil produced by the Hercules Powder Company, and known as Resin X 4000–43. The proportions of ingredients and the conditions of reaction were the same as in Example II.

Analysis showed this additive to contain 0.26% phosphorus and 8.10% sulfur. Performance characteristics of a blend of this product in the same oil as was employed in Example II are shown in Table I.

TABLE I

Performance test data

[10% Additive in mineral oil.]

| Additive | Timken Machine | | | SAE Machine |
|---|---|---|---|---|
| | Load, lbs. | Scar in 1/64" | Lbs./Sq. In. | |
| None | 10 | 1.35 | 9,500 | 60 |
| Example I | 51 | 1.35 | 48,500 | ---------- |
| Example II | 43 | 1.35 | 40,800 | 100 |
| Example III | 43 | 1.65 | 33,400 | 102 |

EXAMPLE IV

Another ester of the same type as described in Examples I, II and III was produced by first preparing the half-ester of rosin and ethylene glycol, followed by further esterification with oleic acid. By this means, a product essentially free of uncombined rosin acids is produced, whereas, in the previous examples, a small amount of free rosin acids remained. Esters free of rosin acids show some improvement in oil solubility and storage stability, especially at elevated temperatures.

The ester just described was treated in the same manner as shown in Example I. After sulfurizing, this ester contained 4.49% sulfur, and after phosphorizing, it contained 0.26% phosphorus and 4.54% sulfur.

The performance of this additive was determined in blends containing small amounts of tricresyl phosphate. Highly effective extreme pressure lubricants were obtained, as shown in Table II.

TABLE II

Performance of lubricants containing tricresyl phosphate

| Additive | Tricresyl Phosphate | Timken Machine | | |
|---|---|---|---|---|
| | | Load, Lbs. | Scar in 1/64" | lbs./sq. in. |
| | Percent | | | |
| 10% Example IV | 0.1 | 33 | 1.5 | 28,200 |
| 10% Example IV | 0.2 | 43 | 1.65 | 33,500 |
| 10% Example IV | 0.3 | 51 | 1.8 | 36,400 |

It will be understood, of course, that compositions of the type referred to above may be added in various quantities to various types of oils, as will be obvious to those skilled in the art. They may be added to relatively light oils, such as oils of automotive engine grades for the purpose of increasing oxidation stability, although normally they will be used more widely in heavier oils such as those of SAE 80, SAE 90 or SAE 140 grade for the lubrication of hypoid gears and other gears where extreme pressure properties are desired. They may also be used in synthetic lubricating oils, for example those of the ester type and of the polyether type, in cutting oils, and in soluble cutting oils in conjunction with sodium sulfonates or other appropriate emulsifying agents. For use in gear oils, proportions of 5 to 20% by weight of the additives are preferred, 10% being a common useful proportion. It will be understood, however, that proportions as low as about 1% may be employed. For concentrates, to be added to oils by the consumer according to his needs, the additive products of this invention may be marketed straight or in 10% to 80% solutions in mineral oil of appropriate grade. The mineral lubricating oils having viscosities between about 35 S. S. U. and 1,000 S. S. U. at 210° F. are preferred and the useful proportions of the additive are ordinarily between 1% and 20% by weight, based on the total composition.

Various conventional additives may be employed in connection with the extreme pressure compound described above, such as thickeners, oiliness agents, oxidation inhibitors, tackiness agents, viscosity index improvers, pour point depressants, and the like. These materials may also be used in greases thickened with soaps, carbon blacks, silica gel and other known grease-forming materials.

What is claimed is:

1. An extreme pressure additive for mineral base lubricating oils consisting essentially of an ester having the formula $$\left[R-\overset{O}{\overset{\|}{C}}-X-(CHZ-CHZ'-X)_n-\overset{O}{\overset{\|}{C}}-Y\right]$$

$$R-\overset{O}{\overset{\|}{C}}-X-(CHZ-CHZ'-X-)_n-Y$$

wherein X is an element selected from the class consisting of oxygen and sulfur;

n is an integer ranging from 1 to 4;

$$\left[-\overset{O}{\overset{\|}{C}}-Y\right]$$

Y is $$-\overset{O}{\overset{\|}{C}}-R'$$

which is the combining radical of a rosin acid;

R is an unsaturated fatty acid *residue* having from 11 to 21 carbon atoms; and

Z and Z' are radicals selected from the class consisting of hydrogen and paraffinic hydrocarbons containing from 1 to 4 carbon atoms, said ester being treated with a sufficient amount of elemental sulfur at a temperature of from 250° F. to 500° F. for from 1 to 10 hours so that the final product contains from about 4.49% to about 8.1% sulfur, and then treated with a sufficient amount of a phosphorus sulfide at a temperature of from 150° F. to 250° F. for from 6 to 12 hours so that the final product contains about 0.21% to 0.31% prosphorus.

2. An extreme pressure additive for mineral base lubricating oils consisting essentially of the ethylene glycol ester of tall oil which has been reacted with an amount of elemental sulfur for from 1 to 10 hours at a temperature of from 250° F. to 500° F. so that the final product contains from about 4.49 to 8.1% sulfur and then reacted with a sufficient amount of a phosphorus sulfide at a temperature of from 150° F. to 250° F. for from 6 to 12 hours so that the final product contains from about 0.21% to 0.31% phosphorus.

3. A lubricating oil composition consisting essentially of a mineral oil base stock containing combined therein from 1 to 20% by weight, based on the total composition, of an ester having the formula

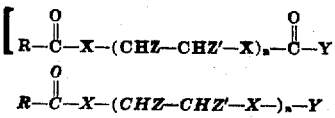

wherein X is an element selected from the class consisting of oxygen and sulfur;

n is an integer ranging from 1 to 4;

Y is

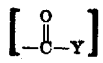

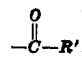

which is the combining radical of a rosin acid;

R is an unsaturated fatty acid *residue* having from 11 to 21 carbon atoms; and

Z and Z′ are radicals selected from the class consisting of hydrogen and paraffinic hydrocarbons containing from 1 to 4 carbon atoms, said ester being treated with a sufficient amount of elemental sulfur at a temperature of from 250° F. to 500° F. for from 1 to 10 hours so that the final product contains from about 4.49% to about 8.1% sulfur, and then treated with a sufficient amount of a phosphorous sulfide at a temperature of from 150° F. to 250° F. for from 6 to 12 hours so that the final product contains about 0.21% to 0.31% phosphorus.

4. A lubricating composition consisting essentially of a mineral oil base stock having combined therein from 1 to 20% by weight based on the total composition of the ethylene glycol ester of tall oil which has been reacted with an amount of elemental sulfur for from 1 to 10 hours at a temperature of from 250° F. to 500° F. so that the final product contains from about 4.49 to 8.1% sulfur and then reacted with a sufficient amount of a phosphorus sulfide at a temperature of from 150° F. to 250° F. for from 6 to 12 hours so that the final product contains from about 0.21% to 0.31% phosphorus.

ELMER B. CYPHERS.

References Cited in the file of this patent or the original patent

UNITED STATES PATENTS

| Number | Name | Date |
|---|---|---|
| 2,211,306 | Whittier et al. | Aug. 13, 1940 |
| 2,385,912 | Davis | Oct. 2, 1945 |
| 2,422,630 | Musselman et al. | June 17, 1947 |
| 2,469,741 | Morway et al. | May 10, 1949 |